(12) United States Patent
Okamoto

(10) Patent No.: US 6,411,795 B2
(45) Date of Patent: Jun. 25, 2002

(54) IMAGE FORMING APPARATUS WITH A TWO-SIDES IMAGE FORMING OPERATION

(75) Inventor: Masami Okamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/790,813

(22) Filed: Feb. 23, 2001

(30) Foreign Application Priority Data

Feb. 25, 2000 (JP) ........................................ 2000-049981
Feb. 2, 2001 (JP) ........................................ 2001-027127

(51) Int. Cl.$^7$ ................................................ G03G 15/00

(52) U.S. Cl. ........................................ 399/401; 399/364

(58) Field of Search ................................ 271/184, 186, 271/185; 399/364, 401, 405, 373, 374

(56) References Cited

U.S. PATENT DOCUMENTS 4,650,313 A * 3/1987 Koike ........................ 399/401

* cited by examiner

Primary Examiner—Arthur T. Grimley
Assistant Examiner—Hoang Ngo
(74) Attorney, Agent, or Firm—Oblon, Spivak, McClelland, Maier & Neustadt, P.C.

(57) ABSTRACT

An image forming apparatus operable in a duplex image transfer mode of the present invention stores image data to be transferred and transfers the image data to a recording medium at an image forming section. In the duplex image transfer mode, a reversing section reverses a paper sheet or similar recording medium passed the image forming section and again delivers it to the image forming section. When image data does not have to be transferred to the rear side of the last paper sheet, the last paper sheet carrying an image on its front side is driven out of the apparatus from the halfway point of a reversal path via an outlet path without the intermediary of the image forming section. The apparatus successfully reduces the conveying time.

34 Claims, 12 Drawing Sheets

IMAGE FORMING APPARATUS WITH A TWO-SIDES IMAGE FORMING OPERATION

BACKGROUND OF THE INVENTION

1. Field of the Invention

The present invention relates to a copier, printer, facsimile apparatus or similar image forming apparatus capable of forming images on both sides of a recording medium.

2. Discussion of the Background

Today, a digital image forming apparatus is extensively used that includes a storing medium for storing image data read out of a document. An image forming section forms a latent image on a photoconductive element in accordance with the image data sequentially read out of the storing medium. A developing section develops the latent image to thereby produce a corresponding toner image. The toner image is transferred from the photoconductive element to a paper sheet or similar recording medium.

There is an increasing demand for duplex image transfer that transfers images to both sides of a paper sheet. An image forming apparatus constructed to meet this demand includes a reversing section for reversing a paper sheet carrying an image on one side thereof and again delivering it to an image forming section. The problem with this type of conventional image forming apparatus is that in a duplex image transfer mode the last paper sheet is necessarily routed from the reversing section to the outside of the apparatus by way of the image forming section even when an image does not have to be transferred to the rear of the paper sheet. This not only consumes an extra period of time, but also reduces the life of a driveline while wasting power.

Technologies relating to the present invention are disclosed in, e.g., Japanese Patent Laid-Open Publication No. 8-20147.

SUMMARY OF THE INVENTION

It is an object of the present invention to provide an image forming apparatus capable of reducing the conveying time by discharging, when an image does not have to be transferred to the rear side of the last paper sheet, the last paper sheet to the outside of the apparatus without again routing it through an image forming section.

In accordance with the present invention, an image forming apparatus stores image data to be transferred and transfers the image data to a recording medium at an image forming section. A reversing section reverses the recording medium and again delivers it to the image forming section to thereby form the image data on both sides of the recording medium. An outlet path is included in the reversing section for directly delivering, when the image data does not have to be transferred to the rear side of the last recording medium, the last recording medium carrying an image on its front side and positioned at the reversing section to the outside of the apparatus without the intermediary of the image forming section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
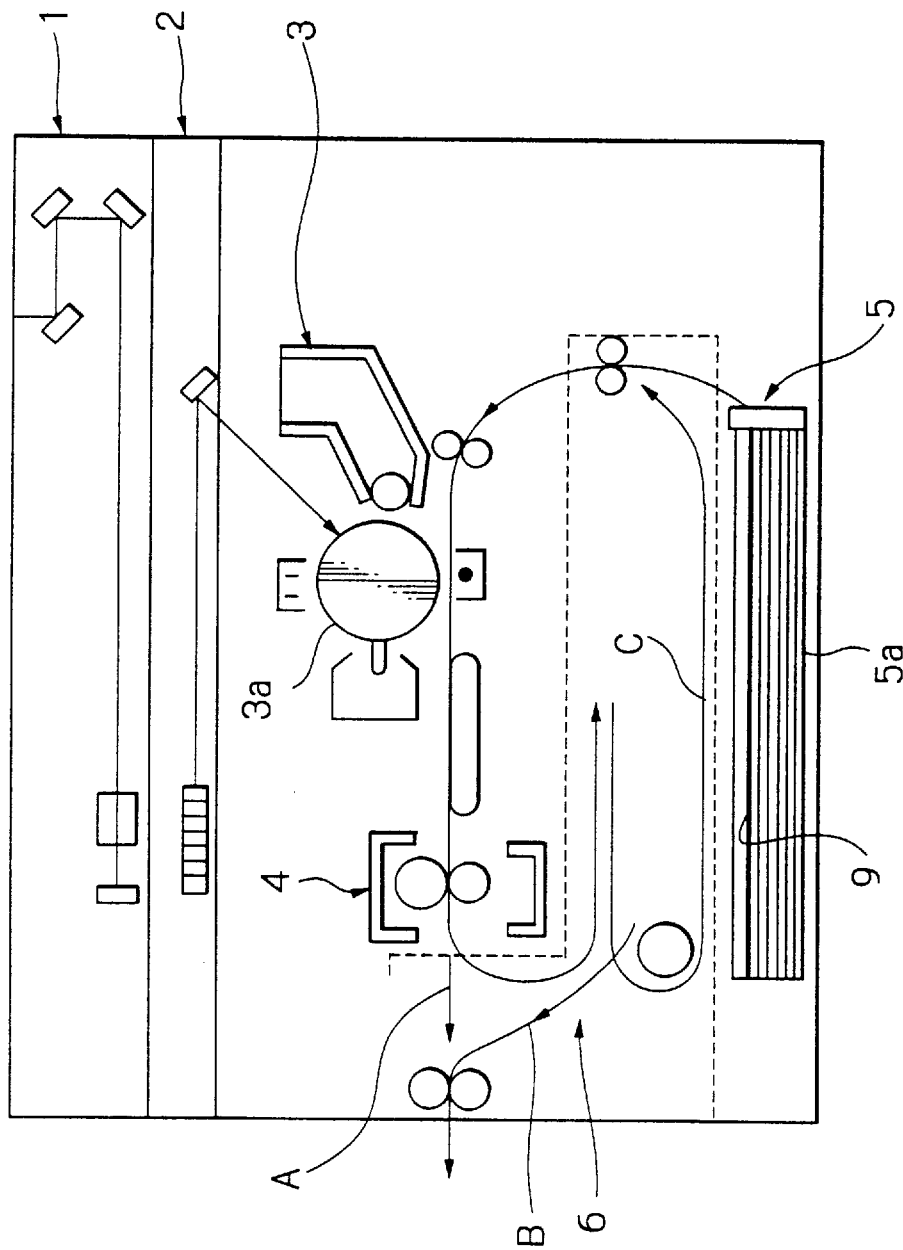
FIG. 1 is a view showing an image forming apparatus embodying the present invention.

Referring to FIG. 1 of the drawings, an image forming apparatus embodying the present invention is shown and implemented as a digital copier by way of example. As shown, the digital copier includes a scanning section 1 for reading a document by scanning it. An image processing section, which will be described later with reference to FIG. 4, executes preselected processing with image data output from the scanning section 1 while temporarily storing the image data. A writing section 2 scans a photoconductive drum 3a, which is a specific form of an image carrier, with a laser beam in accordance with the stored image data, thereby forming a latent image on the drum 3a.

An image forming section, which includes the drum 3a, develops the latent image formed on the drum 3a to thereby produce a corresponding toner image and transfers the toner image to a paper sheet or similar recording medium 9. A fixing section 4 fixes the toner image on the paper sheet 9. A paper feeding section 5 feeds the paper sheet 9 to the image forming section 2. A reversing section reverses the paper sheet 9 and again delivers it to the image forming section 3, so that an image can be transferred to the rear side of the paper sheet 9. A finisher 200 (see FIG. 3) may be connected to the copier at the downstream side of the paper outlet of the copier. Also, an ADF (Automatic Document Feeder) 300 may be mounted on the scanning section 1 in order to automatically feed documents to the scanning section 1 one by one.

More specifically, the scanning section 1 includes a glass platen and optics positioned below the glass platen. The optics reads a document positioned on the glass platen. The resulting image data are stored in the image processing section shown in FIG. 4. The image forming section 3 develops a latent image formed on the drum 3a with toner to thereby produce a toner image, as stated above. The toner image is transferred from the drum 3a to the paper sheet 9 fed from the paper feeding section 5. After the fixing section 4 has fixed the toner image on the paper sheet 9, the paper sheet 9 is selectively steered to the outside of the copier via an outlet path A or to a reversal path C included in the reversing section 6.

The paper feeding section 5 includes a cassette 5a loaded with a stack of paper sheets 9. A mechanism, which will be described later, sequentially feeds the paper sheets 9 from the cassette 5a or the reversal path C toward the image forming section 3. The reversing section, which will be described specifically later with reference to FIG. 2, reverses the paper sheet 9 entered the reversal path C and again delivers it to the image forming section 3 or causes the paper sheet 9 to be driven out of the copier via an outlet path B. The scanning section 1, writing section 2, image forming section 3 and fixing section 4 are conventional and will not be described specifically.

Figure 3:
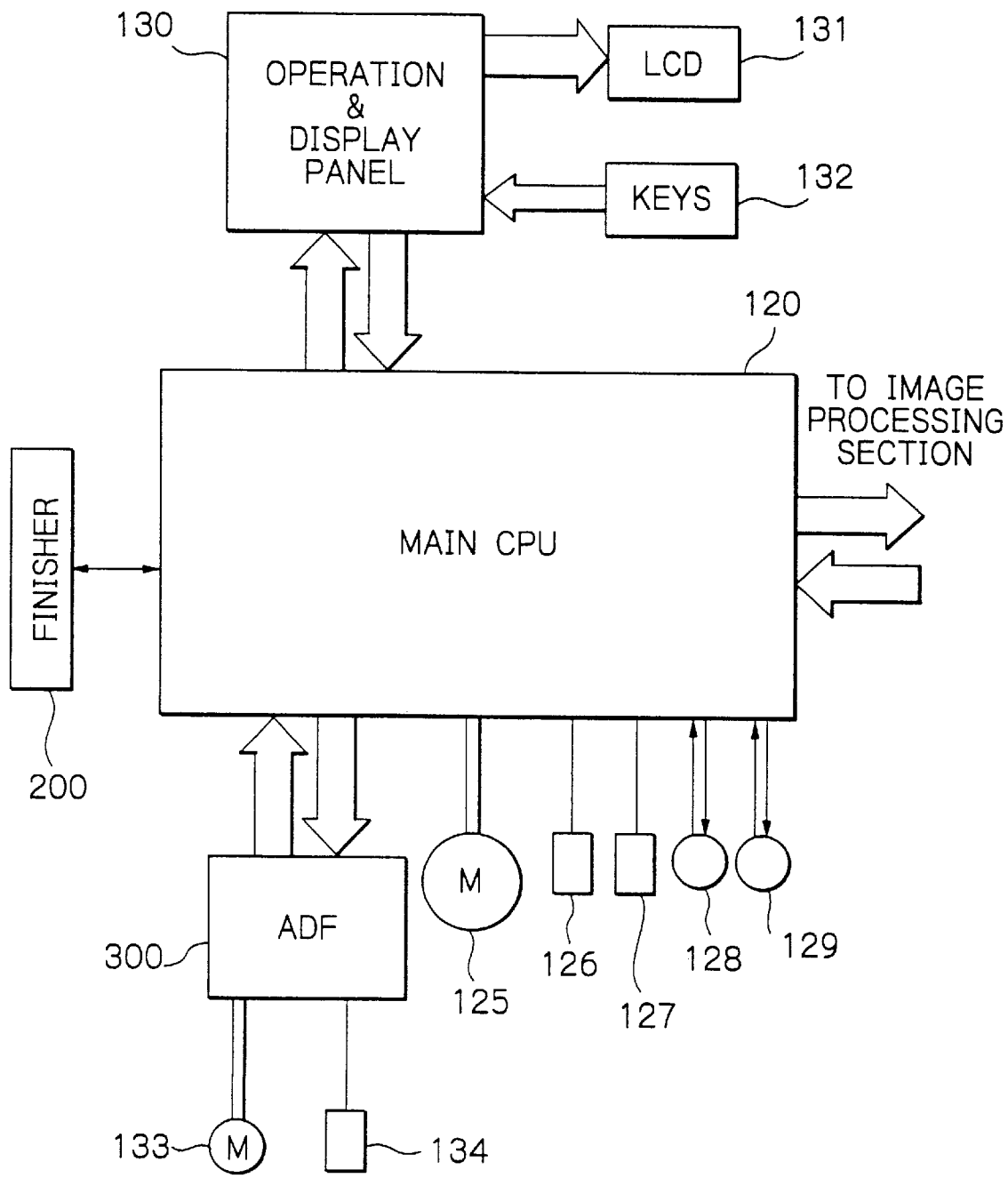
FIG. 3 is a block diagram schematically showing a control system unique to the illustrative embodiment.

FIG. 3 shows a control unit included in the illustrative embodiment. As shown, the control unit is made up of a main CPU (Central Processing Unit) 120 and an operation and display panel 130. The operation and display panel 130 includes a LCD (Liquid Crystal Display) 131 and keys 132. The finisher 200 and ADF 300 mentioned earlier are connected to the CPU 120. The main CPU 120 controls the input of information via the keys 132, the display of information on the LCD 131, and ADF 300. Further, the main CPU 120 controls a main motor 125, solenoids 126, clutches 127, a duplex copy motor 128, a jogger motor 129 and other various loads, not shown, as well as communication with the finisher 200. The solenoids 126 each actuates a particular path selector positioned on the respective path. The ADF 300 includes a conveyance motor 133 and a document set sensor 134. The main CPU 120 is connected to a memory controller 165 (see FIG. 4) included in the image processing section by a bus.

Figure 4:
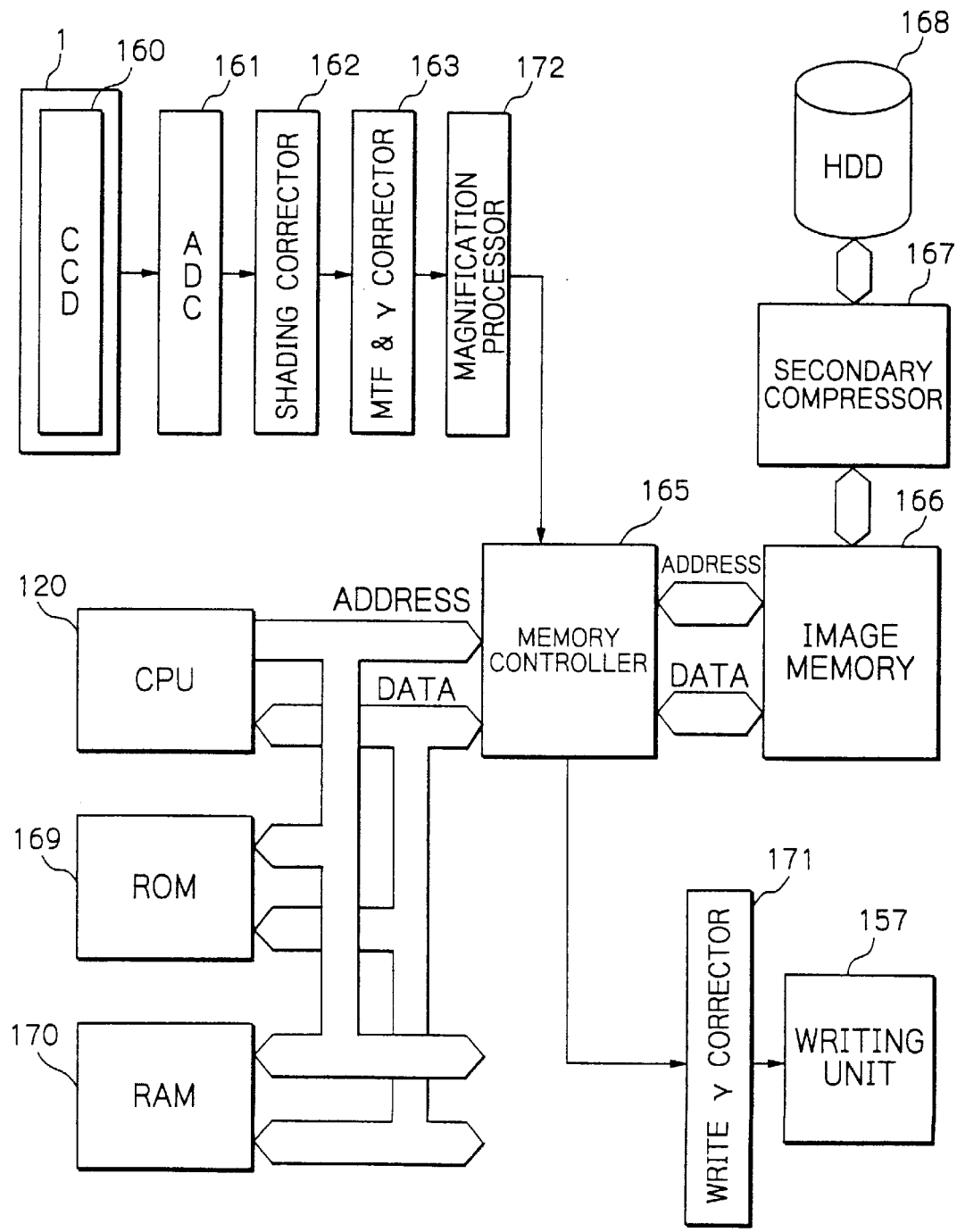
FIG. 4 is a schematic block diagram sowing an image processing section included in the illustrative embodiment.

As shown in FIG. 4, the image processing section includes a memory circuit made up of the memory controller 165, an image memory 166, a secondary compressor 167, and a HDD (Hard Disk Drive) 168. An image data processing circuit includes a CCD (Charge Coupled Device) image sensor 7 160, an ADC (Analog-to-Digital Converter) 161, a shading corrector 162, a MTF (Modulation Transfer Function) and γ corrector 163, and a magnification processor 172. A writing circuit includes a write γ corrector 171 and a writing unit 157. The CPU 120 is connected to the memory controller 165, as mentioned earlier. A ROM (Read Only Memory) 169 and a RAM (Random Access Memory) 170 are connected to the CPU 120. The ROM 169 stores static data including a program to be executed by the CPU 120. The RAM 170 serves as a work area for the CPU 120 and stores dynamic data including data for control to be used by the CPU 120.

In operation, the CCD image sensor 160 outputs an image signal representative of a document image. The ADC 161 converts the image signal to a digital signal or image data. The shading corrector 162 executes shading correction with the image data. The MTF and γ corrector 163 executes MTF and γ correction with the image data output from the shading corrector 162. The magnification processor 172 enlarges or reduces the corrected image data output from the MTF and γ corrector 163 in accordance with a desired magnification change ratio and then inputs the image data to the memory controller 165. The memory controller 165 executes primary compression with the input image data and writes the compressed image data in the image memory 166. The procedure described so far is continuously executed until image data representative of the entire document being scanned have been written to the image memory 166.

The secondary compressor 167 compresses the image data read out of the image memory 166 to thereby further reduce the amount of data, as needed. The image data subjected to the secondary compression are written to the HDD 168, which is a specific form of a storage device. The image data stored in the HDD 168 can be repeatedly read out to produce a plurality of copies or can be read out in such a manner as to change the order of pages, so that the document should only be scanned once. However, when the image data are read out of the HDD 168 for a printing purpose, they must be rearranged in the image memory 166, consuming an extra period of time. Further, the operation for storing the compressed image data in the HDD 168 and the operation for rearranging the image data read out of the HDD 168 cannot be executed at the same time, but must be shifted with respect to time. To print out the image data written to the image memory 166, the image data are fed from the image memory 166 to the writing section 2 via the memory controller 165 and write γ correcting unit 171.

Figure 2:
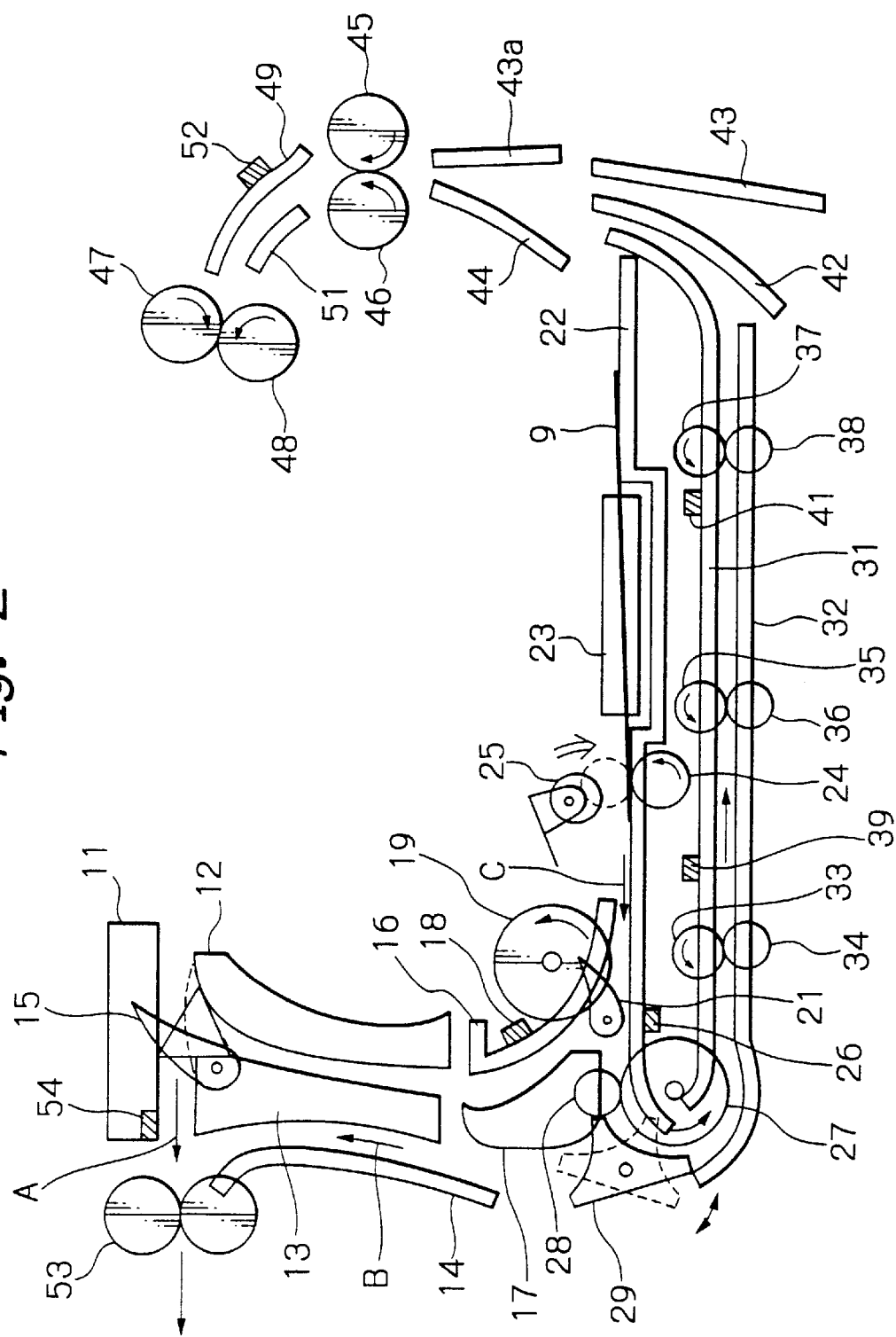
FIG. 2 is a view showing a reversing and discharging section included in the illustrative embodiment.

Reference will be made to FIG. 2 for describing conveying mechanisms included in the reversing section 6 and paper feeding section 5. As shown, the reversing section 6 includes an upper guide 11, a lower guide 12, an intermediate guide 13, and an outside guide 14. The bottom of the upper guide 11, the top of the intermediate guide 13 and the top of the outside guide 14 form the previously mentioned outlet path A therebetween. The lower guide 12 and intermediate guide 13 form a path contiguous with the reversal path C therebetween. Further, the intermediate guide 13 and outside guide 14 form the outlet path B. A path selector 15 is mounted on the upper portion of the intermediate guide 13. The path selector 15 is movable to selectively steer the paper sheet 9 coming out of the fixing unit 4 to the outside of the copier via the outlet path A or to the reversal path C. It should be noted that an outlet path recited in claims refers to the outlet path B.

A pair of inlet guides 16 and 17 are respectively positioned below the lower guide 12 and intermediate guide 13 and form a path contiguous with the reversal path C therebetween. A sensor 18 responsive to the trailing edge of the paper sheet 9 in the direction of paper conveyance is mounted on the inlet guide 16. Also mounted on the inlet guide 16 is a reversible roller 19 whose lower portion protrudes into the above path for conveying the paper sheet 9. A path selector 21 is also positioned on the above path with its free edge being biased toward the roller 19. More specifically, a plurality of rollers 19 and a plurality of path selectors 21 are spaced from each other in the direction perpendicular to the direction of paper conveyance, as viewed in FIG. 2. The path selectors 21 each are positioned between nearby rollers 19. When the paper sheet 9 enters the gaps between the rollers 19 and the path selectors 21, the path selectors 21 press the paper sheet 9 against the rollers 19. In this condition, the rollers 19 convey the paper sheet 9.

A reversal guide 22 extends substantially horizontally in the vicinity of the rollers 19 and path selectors 21. The rollers 19 convey the paper sheet 9 onto the reversal guide 22. A pair of side fences 23 (only one is visible) are mounted on the reversal guide 22 for positioning the paper sheet 9 in the widthwise direction of the paper sheet 9. A reverse drive roller 24 and a reverse driven roller 25 are also mounted on the reversal guide 22 between the rollers 19 and the side fences 23. The reverse drive roller 24 conveys the paper sheet 9 such that the paper sheet 9 returns to the position between the rollers 19 and the side fences 23. The reverse driven roller 25 is usually raised above the reverse drive roller 24, but is lowered into contact with the drive roller 24 only when the paper sheet 9 should be conveyed. A first conveyance sensor 26 responsive to the leading edge of the paper sheet 9 in the direction of paper conveyance is mounted on the underside of the reversal guide 22 in the vicinity of an axis about which the path selector 21 is angularly movable.

A duplex copy drive roller 27 is mounted on part of the reversal guide 22 beneath the inlet guide 17. A duplex copy driven roller 28 is mounted on the lower portion of the guide 17 and pressed against the above drive roller 27. The drive roller 27 and driven roller 28 convey the paper sheet 9 from the reversal guide 22 to the left, as viewed in FIG. 2. An upper guide 31 and a lower guide 32 form therebetween a conveyance path extending from the outlet side of the drive roller 27 and driven roller 28 toward the paper feeding section. This conveyance path conveys the reversed paper sheet 9 toward the paper feeding section. A path selector 29 is positioned at the outside side of the drive roller 27 and driven roller 28 in order to selectively steer the paper sheet 9 to the path between the guides 31 and 32 or to the outlet path B between the intermediate guide 13 and the outside guide 14. A particular solenoid, not shown, is assigned to each of the path selectors 15 and 29.

A first drive roller 33, a second drive roller 35 and a third drive roller 37 are mounted on the upper guide 31 at spaced positions. Likewise, a first driven roller 34, a second driven roller 36 and a third driven roller 38 are mounted on the lower guide 32 at spaced positions. The driven rollers 34 through 38 are pressed against the drive rollers 33 through 37, respectively. The drive rollers 33 and 35 are interlocked to each other, and either one of them is provided-with a clutch not shown. This allows only one of the drive rollers 33 and 35 to start and stop rotating. A second conveyance sensor 39 is positioned between the drive rollers 33 and 35 in order to sense the leading edge of the paper sheet 9 in the direction of paper conveyance. The drive roller 37 is driven independently of the drive rollers 33 and 35 and provided with a clutch not shown. A third conveyance sensor 41 responsive to the leading edge of the paper sheet 9 in the direction of paper conveyance is positioned between the drive rollers 35 and 37.

A refeed guide 42 is positioned at the leading end of the lower conveyance guide 32 in the direction of paper conveyance, i.e., remote from the duplex copy drive roller 27 in order to guide the paper sheet 9 toward a conveyance path included in the paper feeding section S. More specifically, the reversal path C extends from the path between the lower guide 12 and the intermediate guide 13 to the conveyance path of the paper feeding section 5 via the path between the inlet guides 16 and 17, the reversal guide 22, the path between the upper conveyance guide 31 and the lower conveyance guide 32, and the path between the upper conveyance guide 31 and the refeed guide 42.

The paper feeding section 5 includes a path formed between the refeed guide 42 and an outside guide 43 for guiding the paper sheet 9 paid out from the cassette 5a. A guide 43a positioned above the outside guide 43 and an inside guide 44 form a path for conveying the paper sheet 9 coming out of the path between the guides 42 and 43 or the path between the upper guide 31 and the refeed guide 42. A relay drive roller 45 and a relay driven roller 46 are positioned at the outlet side of the path between the guides 43a and 44. The driven roller 46 is pressed against the drive roller 45. An upper and a lower registration roller 47 and 48, respectively convey the paper sheet 9 transferred from the rollers 45 and 46. An upper and a lower preregistration guide 49 and 51 form a path for guiding the paper sheet 9 from the relay drive roller 45 and relay driven roller 46 to the registration rollers 47 and 48. The relay drive roller 45 and lower registration roller 48 each are provided with a respective clutch, not shown, and can start and stop rotating independently.

A preregistration sensor 52 responsive to the trailing edge of the paper sheet 9 is mounted on the upper preregistration guide 49. In addition, a paper discharge sensor 54 is mounted on the surface of the upper outlet guide 11 in order to sense the trailing edge of the paper sheet 9 being driven out via the outlet path A and an outlet roller pair 53.

Figure 5:
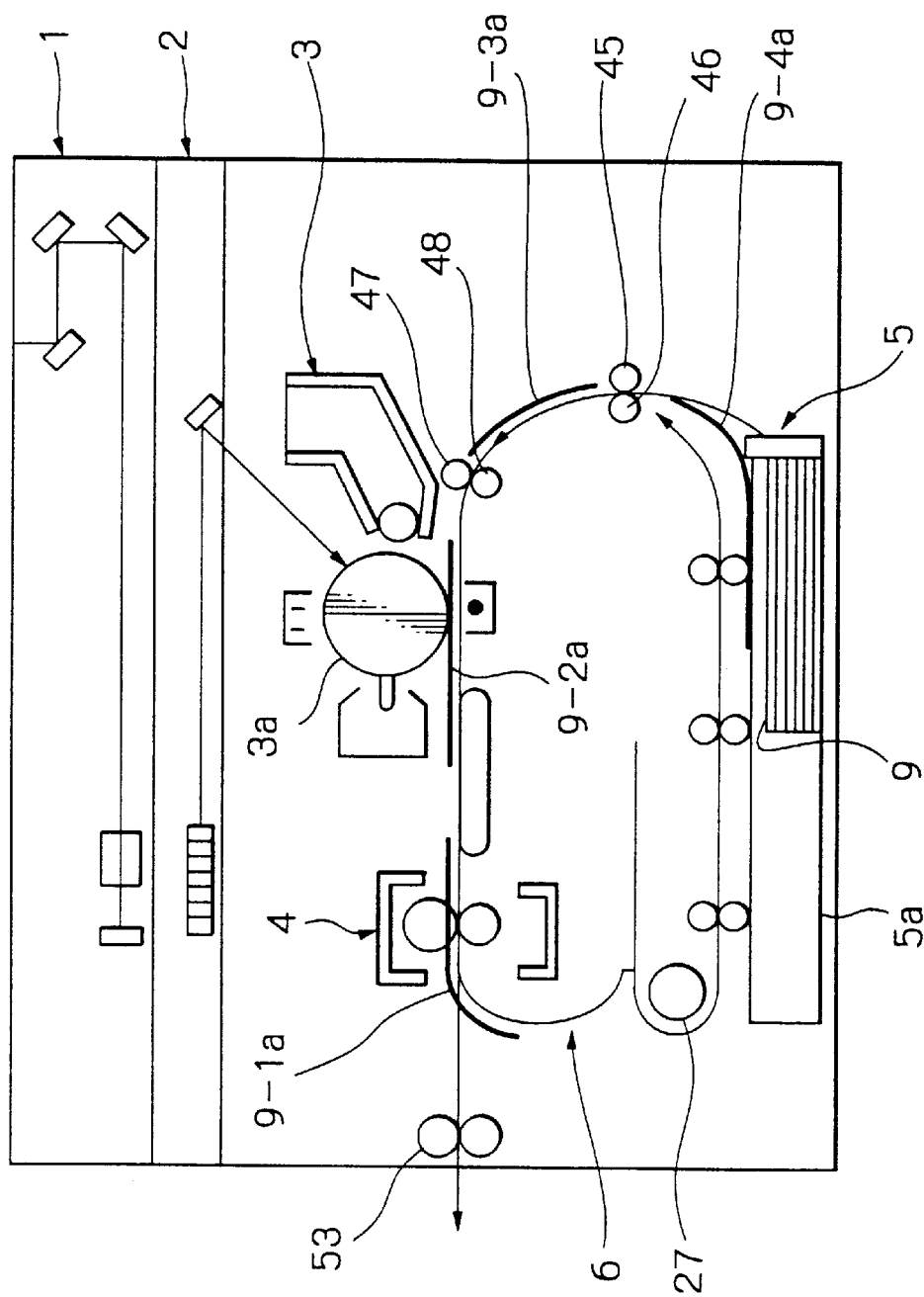
FIG. 5 is a view showing the initial stage of a specific operation of the illustrative embodiment at which a first to a third paper sheet are being conveyed to form images on their front sides.
Figure 6:
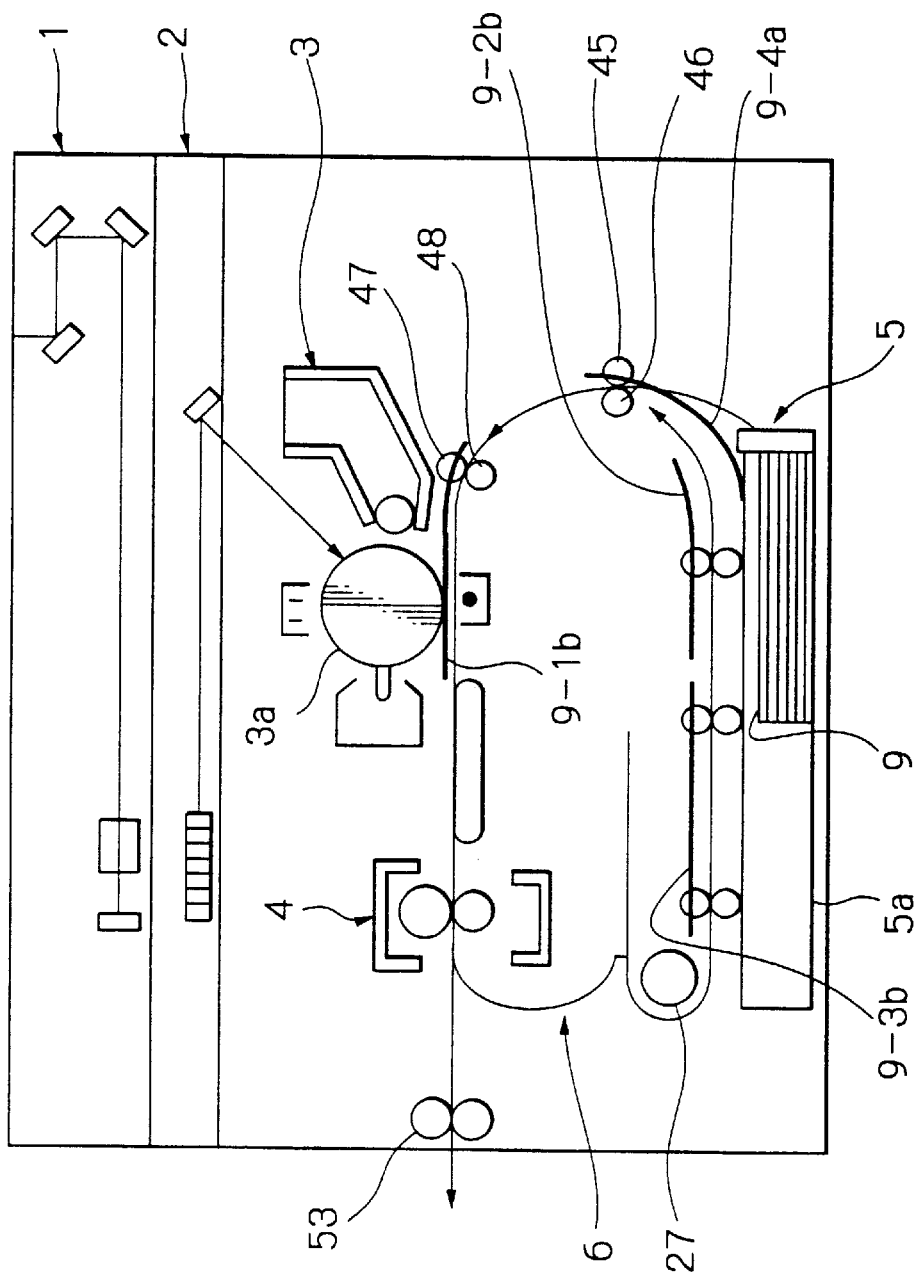
FIG. 6 is a view showing a stage at which the three paper sheets shown in FIG. 5 are being conveyed to form images on their rear sides while a fourth paper sheet is being paid out.
Figure 7:
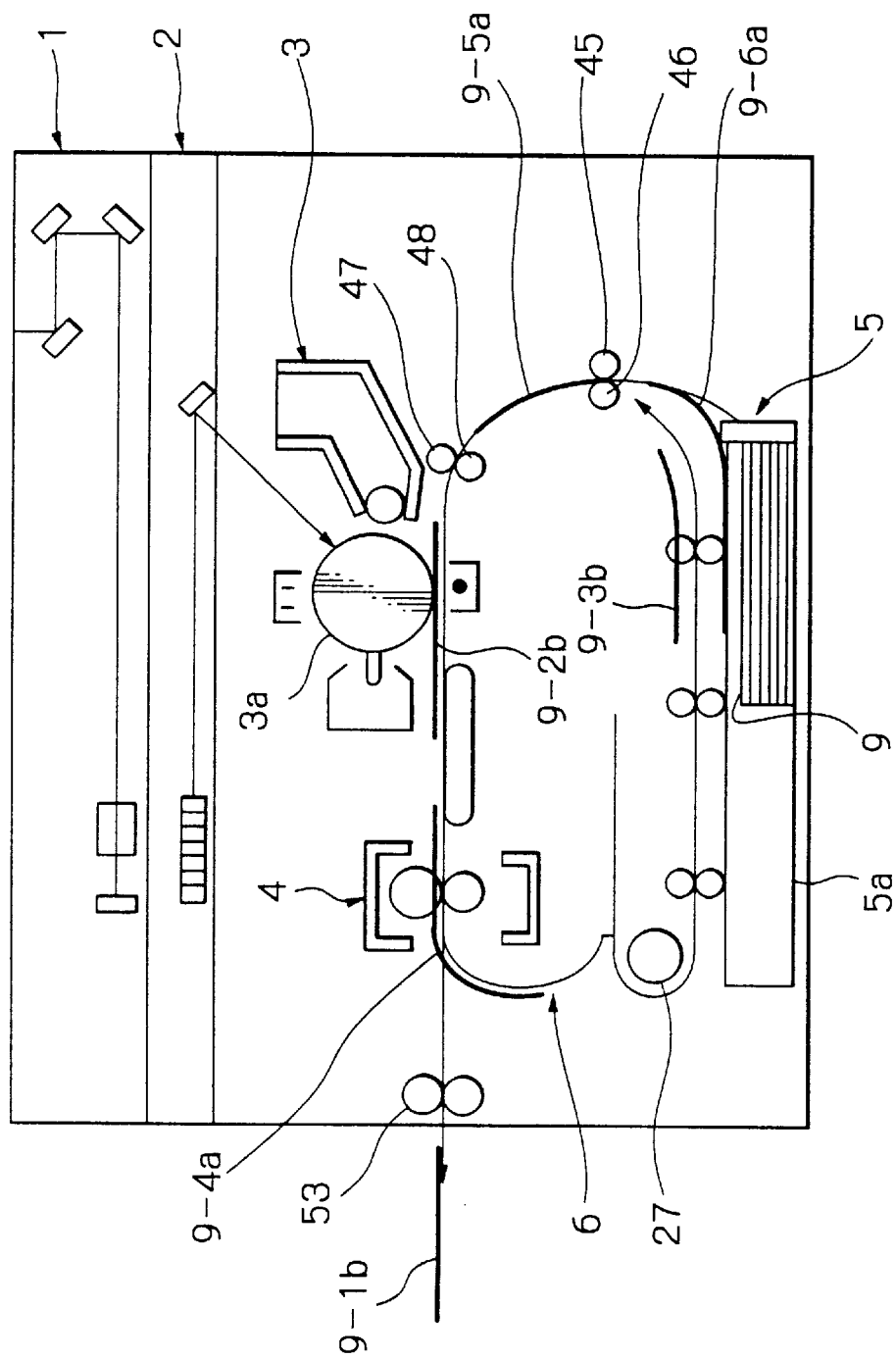
FIG. 7 is a view showing a stage at which the first paper sheet of FIG. 6 is driven out of the apparatus while the fourth paper sheet and a fifth paper sheet are being fed.
Figure 8:
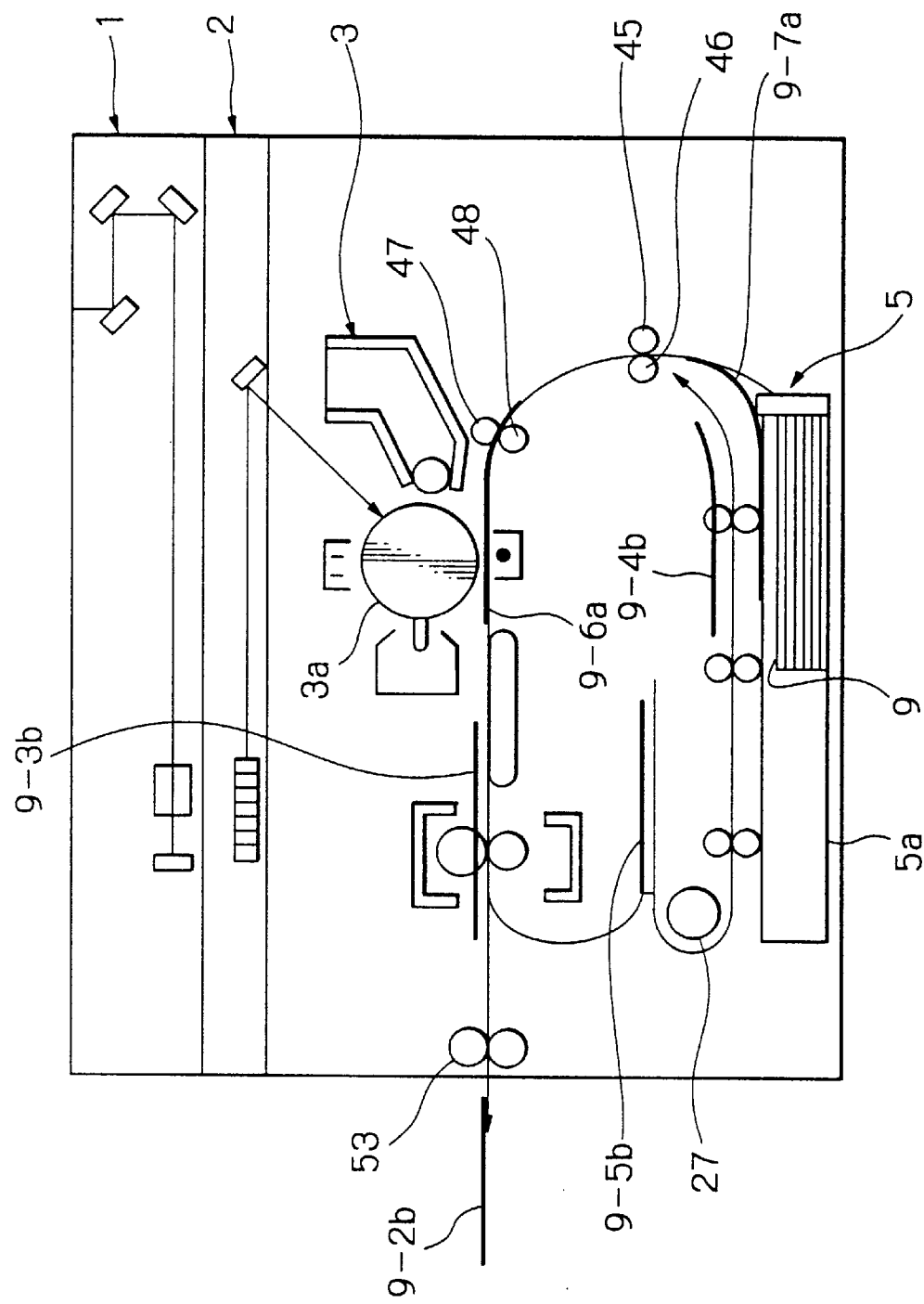
FIG. 8 is a view showing a stage at which the second paper sheet of FIG. 7 is driven out of the apparatus while a sixth paper sheet is being paid out.
Figure 9:
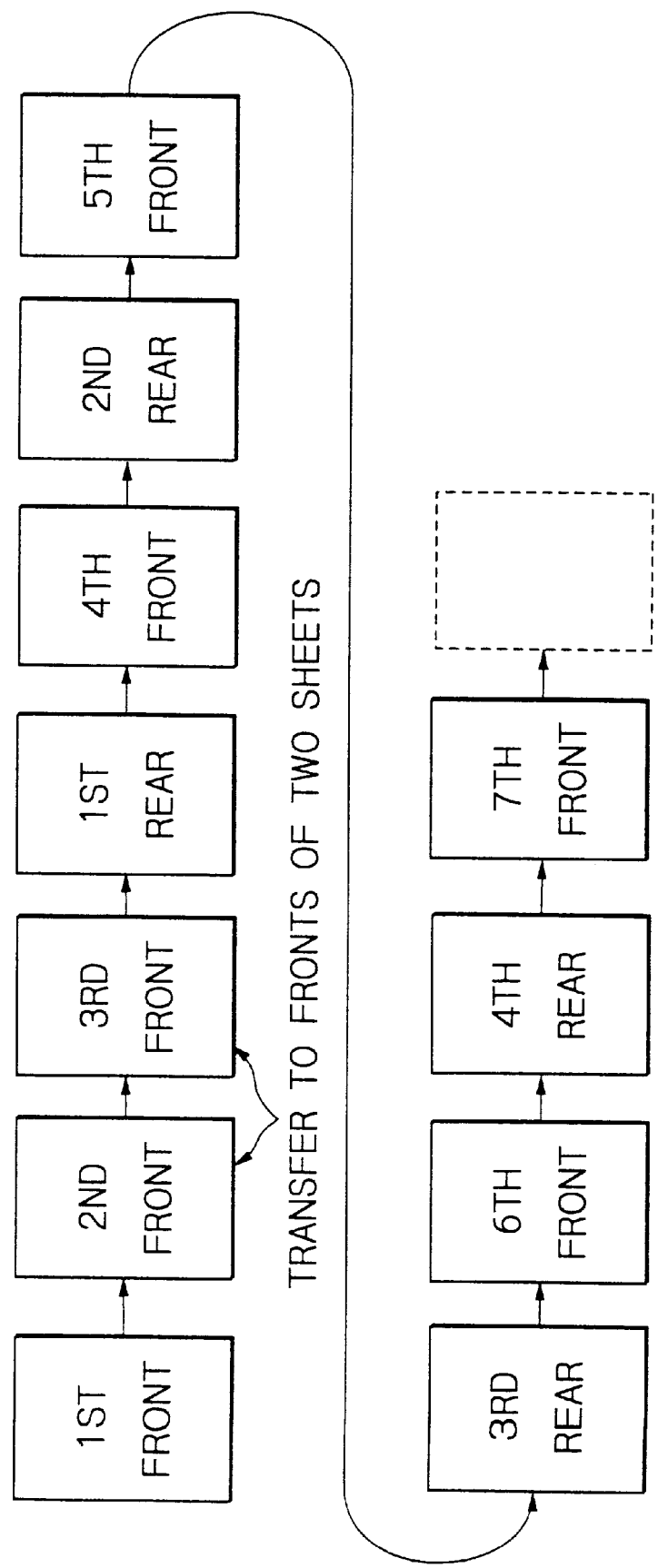
FIG. 9 summarizes the procedure shown in FIGS. 7 through 8.

The operation of the illustrative embodiment will be described hereinafter. First, a usual interleaf operation will be described with reference to FIGS. 5 through 9. FIG. 3 shows a stage at which a first to a third paper sheets are being conveyed to form images on their front sides. FIG. 6 shows a subsequent stage at which the first to third paper sheets are being conveyed to form images on their rear sides while a fourth paper sheet is being paid out. FIG. 7 shows the following stage at which the first paper sheet is driven out of the copier while the fourth and a fifth paper sheet are being conveyed. FIG. 8 shows a further stage at which the second paper sheet is driven out of the copier while a sixth paper sheet is being paid out. FIG. 9 shows such a printing order more specifically.

As shown, to sequentially form the images of a plurality of documents on both sides of the paper sheets 9, images are first formed on the front sides of the first to third paper sheets 9 continuously. Subsequently, an image is formed on the rear side of the first paper sheet. An image is then formed on the front side of the fourth paper sheet before the formation of an image on the rear side of the second paper sheet. Thereafter, an image is formed on the rear side of the second paper sheet. Such a procedure refers to interleaf control. That is, images are sequentially formed on the front sides of a preselected number of paper sheets, and then images are alternately formed on the front side and rear side.

The above procedure is easy to practice because the writing section 2 writes the image data in the image memory 166 or the HDD 168 (storing means). The memory controller 165 sets the order in which the image data should be read out of the storing means, while controlling the read-out. The CPU 120, which controls the scanning section 1, writing section 2 and image forming section 3, executes various kinds of control described above and to be described later in accordance with the outputs of the sensors 16, 26, 39, 41, 52 and 54.

In the following description, the order of paper sheets 9 sequentially conveyed is indicated by reference numerals 9-1, 9-2 and so forth. Suffixes a and b attached to the order of paper feed are representative of the front side and rear side, respectively. For example, "9-2a" is representative of the front side of the second paper sheet.

To form an image only on the front side of the paper sheet 9, the path selector 15 is switched to a position indicated by a phantom line in FIG. 2. In this condition, after an image has been transferred to the paper sheet 9 fed from the cassette 5a, the paper sheet 9 is driven out of the copier via the fixing section 4, outlet path A, and outlet roller pair 53.

To form images on both sides of the paper sheets 9, the operator of the copier inputs a duplex copy command on the operation and display panel 130. In response, the path selector 15 is switched to a position indicated by a solid line in FIG. 2. In this condition, as shown in FIG. 5, the first paper sheet 9-1, second paper sheet 9-2 and third paper sheet 9-3 are sequentially fed from the cassette 5a so as to transfer images to their front sides. The path selector 15 steers the first paper sheet 9-1 coming out of the fixing section 4 to the reversal path C between the guides 12 and 13. At this time, the second paper sheet 9-2 is positioned at the image forming section 3 while the third paper sheet 9-3 is positioned between the registration rollers 47 and 48 and the relay roller pairs 45 and 46. The fourth paper sheet 9-4 is paid out of the cassette 5a beforehand and brought to a stop with its leading edge being positioned between the guides 42 and 43.

The paper sheet 9-1 is conveyed to the reversal guide 22 via the reversal path C and positioned in the widthwise direction on the guide 22 by the side fences 23. On the elapse of a preselected period of time since the sensor 18 has sensed the trailing edge of the paper sheet 9-1, the reverse drive roller 24 is driven. At the same time, the reverse driven roller 25 is lowered into contact with the driver roller 24. The rollers 24 and 25 therefore cooperate to convey the paper sheet 9-1 backward to the duplex copy drive roller 27 and duplex copy driven roller 28 via the path below the path selector 21. The drive roller 27 and driven roller 28 convey the paper sheet 9-1 into the path between the guides 31 and 32. As a result, the paper sheet 9-1 is conveyed to the image forming section 3 with its rear side facing upward (FIG. 6), so that an image is formed on the rear side.

As soon as the preregistration sensor 52 senses the trailing edge of the first paper sheet 9-1, the fourth paper sheet 9-4 again begins to be conveyed toward the image forming section 3. In response to the output of the above sensor 52, the seventh page or document is read out of the storing means and then copied on the front side of the paper sheet 9-4. As for the second paper sheet 9-2, the clutch of the third conveyance drive roller 37 is uncoupled on the elapse of a preselected period of time since the third conveyance sensor 41 has sensed the leading edge of the paper sheet 9-2. Consequently, the drive roller 37 stops rotating and therefore stops conveying the paper sheet 9-2. On the elapse of a preselected period of time since the second conveyance sensor 39 has sensed the leading edge of the third paper sheet 9-3, the clutch of the first conveyance drive roller 33 or that of the second conveyance drive roller 35 is uncoupled, causing the drive roller 33 or 35 to stop conveying the paper sheet 9-3.

As soon as the preregistration sensor 52 senses the trailing edge of the fourth paper sheet 9-4, the clutch of the drive roller 37 is coupled to cause the drive roller 37 to resume its rotation and again start conveying the reversed second paper sheet 9-2. Thereafter, the clutch of the drive roller 33 or that of the drive roller 35 is coupled to resume the conveyance of the third paper sheet 9-3. When the third conveyance sensor 41 senses the leading edge of the paper sheet 9-3, the clutch of the drive roller 37 is uncoupled to stop the rotation of the drive roller 37 and therefore the conveyance of the paper sheet 9-3. At this instant, the fifth paper sheet 9-5, like the fourth paper sheet 9-4, is held in a halt with its leading edge being positioned between the guides 42 and 43. When the preregistration sensor 52 senses the trailing edge of the second paper sheet 9-2 whose rear side is facing upward, the fifth paper sheet 9-5 begins to be conveyed. At this time, the first paper sheet 9-1 carrying images on both sides thereof, i.e., a duplex copy is driven out of the copier (FIG. 7).

While an image is formed on the fifth paper sheet 9-5 by the image forming section 3, the paper sheet or duplex copy 9-2 is driven out of the copier face down. When the preregistration sensor 52 senses the trailing edge of the paper sheet 9-5, the clutch of the drive roller 37 is coupled to cause the third drive roller 37 to start rotating and again feeding the reversed third paper sheet 9-3. As soon as the preregistration sensor 52 senses the trailing edge of the paper sheet 9-5, the sixth paper sheet 9-6 begins to be conveyed from the path between the guides 42 and 43.

As shown in FIG. 9, to summarize the above-described procedure, after images have been sequentially transferred to the front sides of the first to third paper sheets, an image is transferred to the rear side of the first paper sheet. Subsequently, an image is transferred to the front side of the fourth paper sheet, and then an image is transferred to the rear side of the second paper sheet. Images are then sequentially transferred to the front side of the fifth paper sheet and then to the rear side of the third paper sheet. In this manner, images are first sequentially transferred to the front sides of the first three paper sheets. Subsequently, images are alternately transferred to the front sides of another two paper sheets and the rear side of another paper sheet before the transfer of images to the rear sides of the first three paper sheets. More specifically, the reversal path C extending from the fixing section 4 to the relay roller pair 45 and 46 has a greater length than the path extending from the relay roller pair 45 and 46 to the fixing section 4. Therefore, a longer period of time is necessary for the paper sheet 9 come out of the image forming section 3 to be reversed and again brought to the image forming section 3 than for a fresh paper sheet paid out form the cassette 5a to reach the image forming section 3. The paper sheets 9 are dealt with in the above order in order to effectively use such a time lag.

Figure 10:
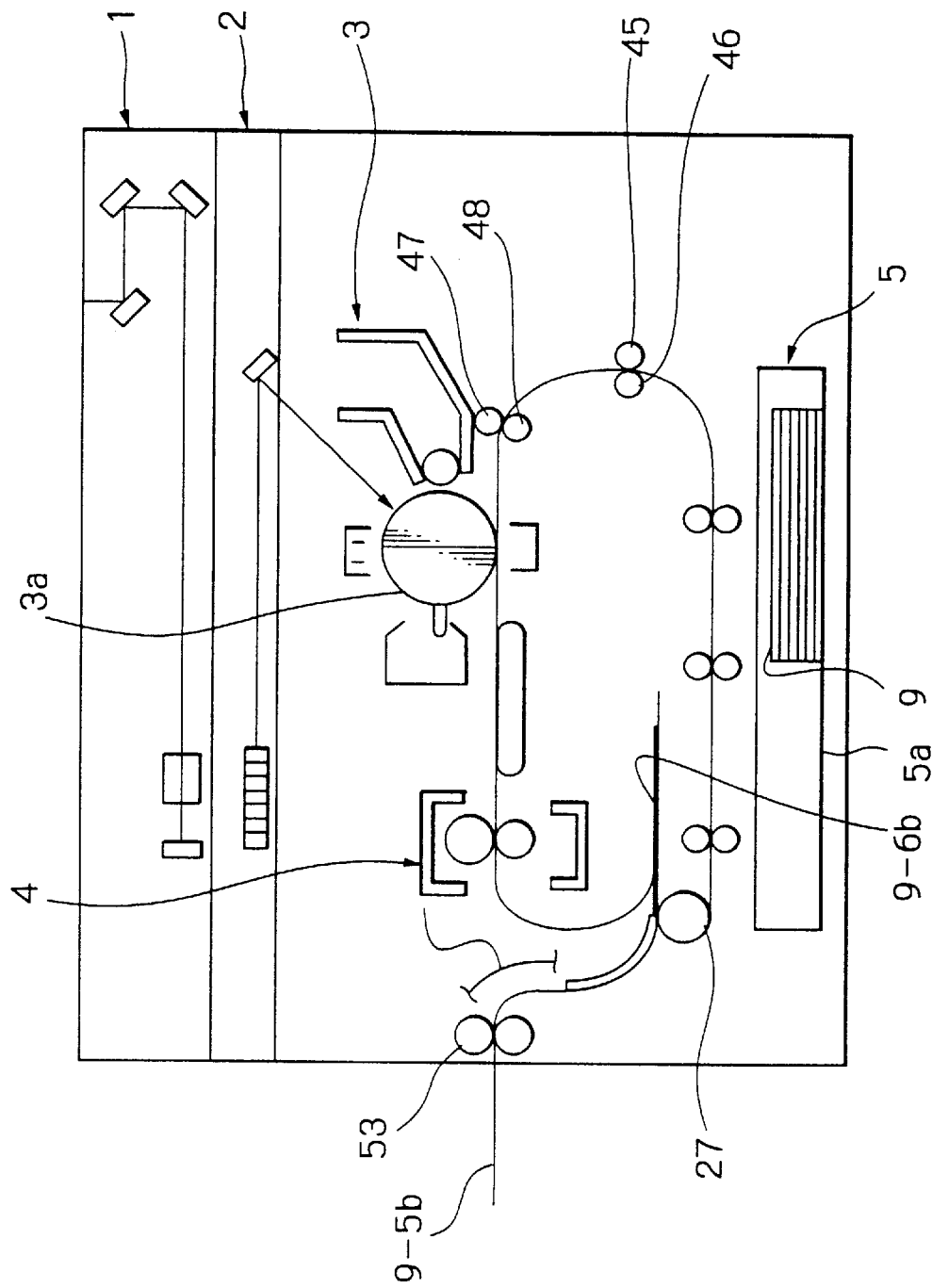
FIG. 10 is a view showing another specific operation of the illustrative embodiment to be executed when an image does not have to be transferred to the rear side of the sixth paper sheet.
Figure 11:
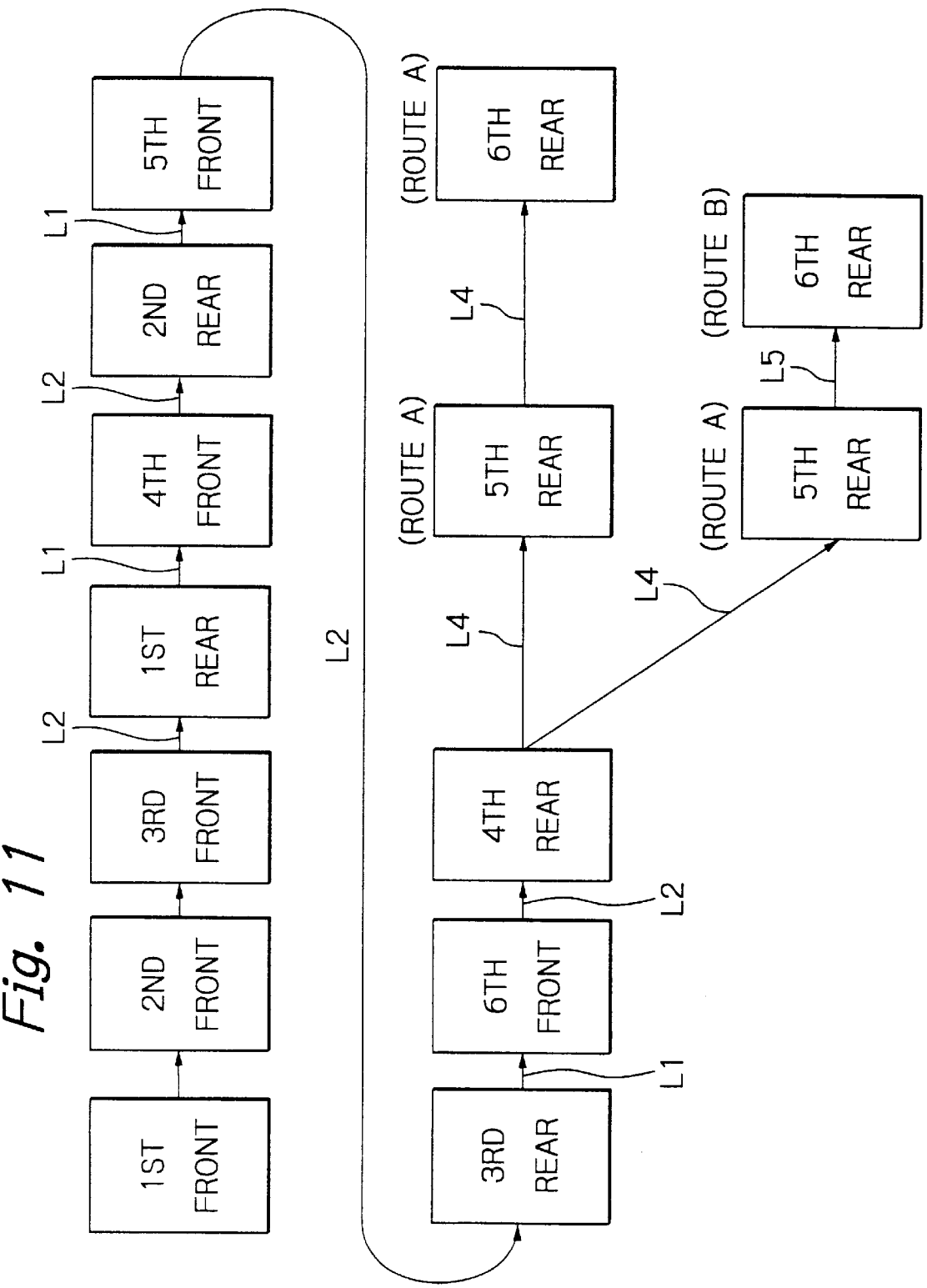
FIG. 11 shows specific intervals between consecutive paper sheets particular to the operation of FIG. 10.

In the usual Interleaf operation described above, when eleven pages or documents, for example, are reproduced on consecutive paper sheets, it is not necessary to transfer an image to the rear side of the sixth paper sheet. Reference will be made to FIGS. 10 and 11 for describing a specific interleaf procedure to be executed when such an odd number of pages are to be copied on paper sheets. Specifically, FIG. 10 shows how paper sheets are driven out of the copier while FIG. 11 shows intervals between the paper sheets.

As shown in FIG. 10, the sixth paper sheet 9-6 carrying an image on one side thereof and positioned on the reversal guide 22 does not have to be again fed to the image forming section 3. Therefore, the reversal drive roller 24 and reversal driven roller 25 convey the sixth paper sheet 9-6 toward the duplex copy drive roller 27 and duplex copy driven roller 28. When the first conveyance sensor 26 senses the leading edge of the paper sheet 9-6, the drive roller 27 stops rotating. At the same time, the path selector 29 is so switched as to steer the paper sheet 9-6 to the outlet path B between the intermediate guide 13 and the outside guide 14. Consequently, the paper sheet 9-6 is brought to the outlet roller pair 53 via the outlet path B without being routed through the image forming section 3 or the path A. This successfully makes it needless to drive the image forming section 3 and fixing section 4 and thereby extends their service lives.

As shown in FIG. 11, assume that the interval between the stop of conveyance based on the output of the outlet sensor 54 and the restart of conveyance is L1 between a paper sheet 9 facing downward and the following paper sheet 9 facing upward or L2 between a paper sheet 9 facing upward and the following paper sheet 9 facing downward. Such relations are represented by the third paper sheet facing upward to the fourth paper sheet facing downward in FIG. 11. On the other hand, although the transfer of an image to the rear side of the fourth paper sheet 9-4 is followed by the transfer of an image to the rear side of the fifth paper sheet 9-5, a paper sheet 9 whose front side should be subjected to image formation does not exist between the above image transfer. Consequently, an interval between the rear side of the paper sheet 9-4 and the front side of the paper sheet 9-5 is L4 that is greater than L1 or L2.

The rear side of the paper sheet 9-5 is followed by the rear side of the sixth paper sheet 9-6 also at the interval L4. In this manner, images are expected to be continuously transferred to the rear sides of the three paper sheets 9-4, 9-5 and 9-6, but it is not necessary to transfer an image to the rear side of the paper sheet 9-6. The sixth paper sheet 9-6 carrying an image on its front side is directly driven out via the outlet path, as stated earlier. As a result, an interval L5 between the rear side of the paper sheet 9-5 and that of the paper sheet 9-6 can be made smaller than L4. In light of this, when the paper sheet 9-5 is driven out to the outlet roller pair 53 via the path A, the paper sheet 9-6 held on the reversal guide 22 begins to be conveyed as soon as the outlet sensor 54 senses the trailing edge of the paper sheet 9-5. At the same time, the path selector 29 is so positioned as to steer the paper sheet 9-6 toward the outlet roller 53 via the outlet path B. When an image does not have to be transferred to the rear side of the last paper sheet, the above procedure successfully reduces a period of time necessary for the last paper sheet to be discharged and thereby enhances productivity as to image formation.

Figure 12:
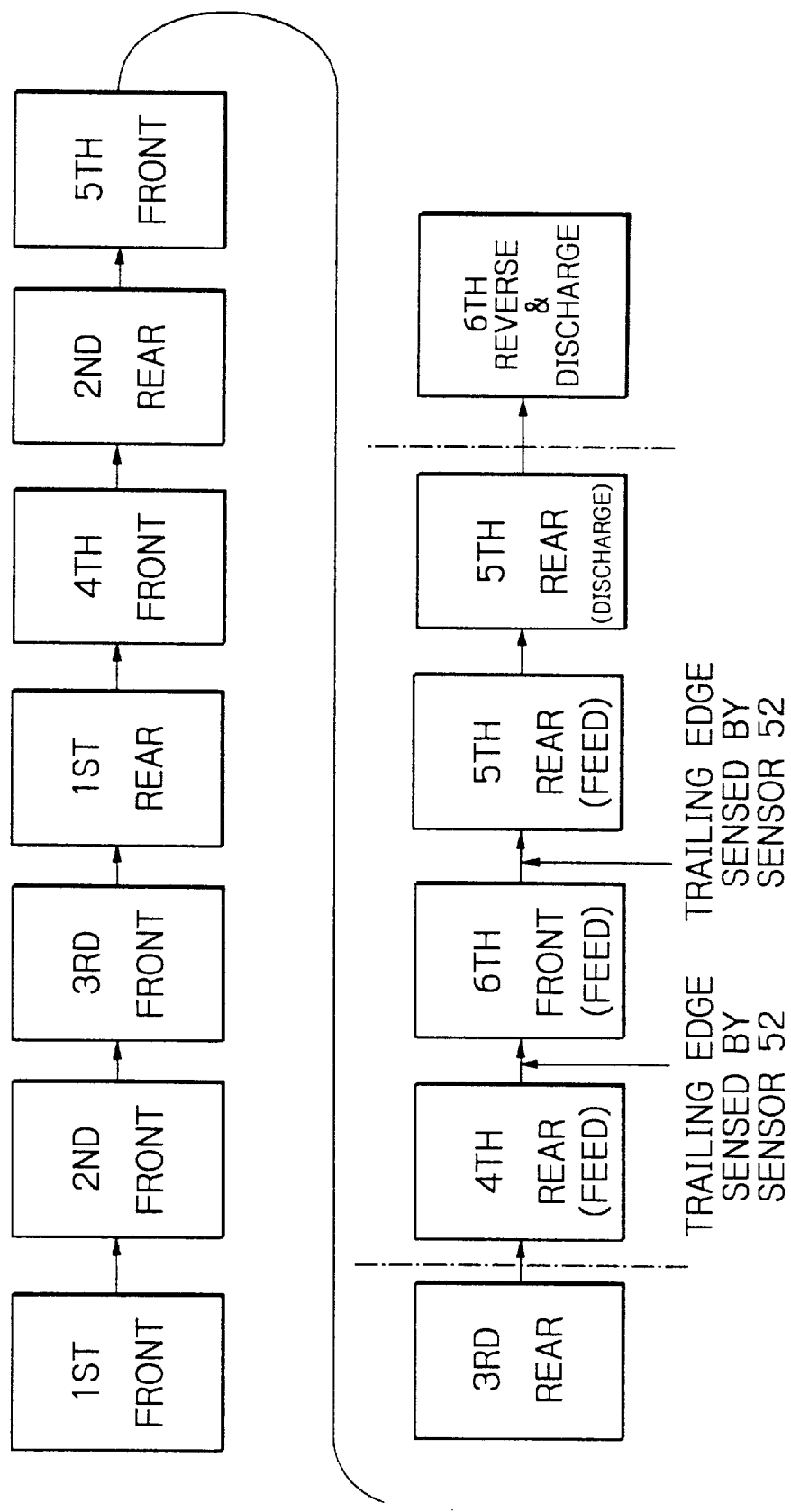
FIG. 12 shows other specific intervals between consecutive paper sheets.

FIG. 12 shows another specific interleaf procedure available with the illustrative embodiment when an odd number of pages are to be copied on paper sheets. The specific procedure of FIG. 11 reduces the processing time, as stated above. However, as shown in FIG. 11, after the second paper sheet from the last has been driven out, the last paper sheet is brought to the reversal path C, reversed, and then driven out via the output path B. Consequently, an interval L5 between the discharge of the second paper sheet from the last and the discharge of the last paper sheet is greater than L1 or L2. The alternative interleaf control to be described with reference to FIG. 12 reduces the interval L5 by reversing and then discharging the last or sixth paper sheet after the registration start of the rear side of the third paper sheet from the last, i.e., the rear of the fourth paper sheet.

Specifically, while the last paper sheet is being discharged via the reversal path (B), the second paper sheet from the last (fifth paper sheet) carrying an image on the rear side is directly driven out via the path A (straight discharge), passing the last paper sheet ahead. More specifically, as shown in FIG. 12, When the preregistration sensor 52 senses the trailing edge of the third paper sheet (rear side) from the last, the last paper sheet (front side) is paid out from the cassette 5a. As soon as the sensor 52 senses the trailing edge of the last paper sheet, the clutch of the third drive roller 37 is coupled to cause the drive roller 37 to start rotating. As a result, the drive roller 37 conveys the second paper sheet from the last (rear of the fifth paper sheet) to the image forming section 3. The second paper sheet from the last carrying images on its both sides is directly driven out, as stated above. At this time, the last or sixth paper sheet carrying an image on its front side has been reversed and is being discharged via the outlet path B. Therefore, just after the second paper from the last has left the outlet roller pair 53, the last paper sheet is nipped by the roller pair 53 and driven out thereby.

As stated above, the procedure shown in FIG. 12 is capable of reducing the total processing time more than the procedure shown in FIG. 11.

In summary, it will be seen that the present invention provides an image forming apparatus achieving various unprecedented advantages, as enumerated below.

(1) When an image does not have to be transferred to the rear side of the last paper sheet, the last paper sheet is directly driven out from a reversal path via an outlet path. It is therefore not necessary to drive a driveline extending to the outside of the apparatus via an image forming section. This extends the life of the image forming section and that of the driveline while saving power.

(2) The last paper sheet is conveyed from the reversal path to the outlet path and can therefore be correctly discharged in order of page after two-sided paper sheets or duplex copies have been driven out of the copier.

(3) The trailing edge of the second paper sheet from the last and the leading edge of the last paper sheet are driven out of the copier at a shorter interval than the trailing edge of another paper sheet and the leading edge of the next paper sheet. This reduces a period of necessary for the last paper sheet to be driven out of the copier and thereby enhances productivity as to image formation.

(4) When sensing means senses the trailing edge of the second paper sheet from the last, the last paper sheet is conveyed to the outlet path. The last paper sheet can therefore be surely laid on the second paper sheet form the last.

(5) After the third paper sheet from the last has been conveyed to the image forming section via a registration position, the last paper sheet is paid out from a paper feeding section. After the last paper sheet has reached the image forming section via the registration position, the second paper sheet from the last is conveyed toward the image forming section, This allows the last paper sheet and the second paper sheet from the last to be discharged without any waste of time.

(6) The last paper sheet is reversed before the straight discharge of the second paper sheet from the last from the image forming section, and then discharged via the outlet path after the second paper sheet from the last. The interleaf operation can therefore be completed in the shortest possible time.

Various modifications will become possible for those skilled in the art after receiving the teachings of the present disclosure without departing from the scope thereof.

What is claimed is:

1. An image forming apparatus for storing image data and providing said image data to a recording medium at an image forming section, said image forming apparatus comprising:

a reversing section for reversing the recording medium and again delivering said recording medium to the image forming section to thereby form the image data on both sides of said recording medium; and an outlet path included in said reversing section for directly delivering, when the image data does not have to be transferred to a rear side of a last recording medium, said last recording medium carrying an image on a front side thereof and positioned at said reversing section to an outside of said image forming apparatus without the intermediary of the image forming section, wherein the last recording medium is reversed by said reversing section before a second recording medium from the last is delivered to an outside after said second recording medium from the last has been delivered to the outside.

2. An apparatus as claimed in claim 1, wherein said reversing section reverses a direction of conveyance of the recording medium from the image forming section and turns over said recording medium, said outlet path being formed at a position which said recording medium delivered from said reversing section passes.

3. An apparatus as claimed in claim 2, wherein said reversing section delivers a trailing edge of a second recording medium from the last and a leading edge of the last recording medium to the outside at an interval smaller than an interval between a trailing edge of another recording medium and a leading edge of a recording medium following said another recording medium.

4. An apparatus as claimed in claim 3, further comprising sensing means disposed in a discharging section, which discharges the recording medium to the outside, for sensing a pass of said recording medium, wherein when said sensing means senses a pass of the second recording medium from the last, the last recording medium is delivered to said outlet path.

5. An apparatus as claimed in claim 4, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

6. An apparatus as claimed in claim 5, wherein the recording medium is reversed by said reversing section before the second medium from the last is directly discharged from the image forming section to the outside, and is then discharged via said outlet path after a discharge of said second recording medium from the last. a discharge of said second recording medium from the last.

7. An apparatus as claimed in claim 3, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

8. An apparatus as claimed in claim 7, wherein the last recording medium is reversed by said reversing section before the second paper sheet from the last is directly discharged from the image forming section to the outside, and is then discharged via said outlet path after a discharge of said second recording medium from the last.

9. An apparatus as claimed in claim 2, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

10. An apparatus as claimed in claim 9, wherein the last recording medium is reversed by said reversing section before the second paper sheet from the last is directly discharged from the image forming section to the outside, and is then discharged via said outlet path after a discharge of said second recording medium from the last.

11. An apparatus as claimed in claim 1, wherein said reversing section delivers a trailing edge of a second recording medium from the last and a leading edge of the last recording medium to the outside at an interval smaller than an interval between a trailing edge of another recording medium and a leading edge of a recording medium following said another recording medium.

12. An apparatus as claimed in claim 11, further comprising sensing means disposed in a discharging section, which discharges the recording medium to the outside, for sensing a pass of said recording medium, wherein when said sensing means senses a pass of the second recording medium from the last, the last recording medium is delivered to said outlet path.

13. An apparatus as claimed in claim 12, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

14. An apparatus as claimed in claim 13, wherein the last recording medium is reversed by said reversing section before the second paper sheet from the last is directly discharged from the image forming section to the outside, and is then discharged via said outlet path after a discharge of said second recording medium from the last.

15. An apparatus as claimed in claim 11, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

16. An apparatus as claimed in claim 15, wherein the last recording medium is reversed by said reversing section before the second paper sheet from the last is directly discharged from the image forming section to the outside, and is then discharged via said outlet path after a discharge of said second recording medium from the last.

17. An apparatus as claimed in claim 1, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

18. An apparatus as claimed in claim 17, wherein the last recording medium is reversed by said reversing section before the second paper sheet from the last is directly discharged from the image forming section to the outside, and is then discharged via said outlet path after a discharge of said second recording medium from the last.

19. An image forming apparatus for storing image data and providing said image data to a recording medium at an image forming section, said image forming apparatus comprising:

a reversing section for reversing the recording medium and again delivering said recording medium to the image forming section to thereby form the image data on both sides of said recording medium; and an outlet path included in said reversing section path, for directly delivering, when the image data does not have to be transferred to a rear side of a last recording medium, said last recording medium carrying an image on a front side thereof and positioned at said reversing section to an outside of said image forming apparatus without the intermediary of the image forming section, wherein said reversing section reverses a direction of conveyance of the recording medium from the image forming section and turns over said recording medium, said outlet path being formed at a position which said recording medium delivered from said reversing section passes, and wherein said reversing section delivers a trailing edge of a second recording medium from the last and a leading edge of the last recording medium to the outside at an interval smaller than an interval between a trailing edge of another recording medium and a leading edge of a recording medium following said another recording medium.

20. An apparatus as claimed in claim 19, further comprising sensing means disposed in a discharging section, which discharges the recording medium to the outside, for sensing a pass of said recording medium, wherein when said sensing means senses a pass of the second recording medium from the last, the last recording medium is delivered to said outlet path.

21. An apparatus as claimed in claim 20, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

22. An apparatus as claimed in claim 21, wherein the last recording medium is reversed by said reversing section before the second paper sheet from the last is directly discharged from the image forming section to the outside, and is then discharged via said outlet path after a discharge of said second recording medium from the last.

23. An apparatus as claimed in claim 19, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

24. An apparatus as claimed in claim 23, wherein the last recording medium is reversed by said reversing section before the second paper sheet from the last is directly discharged from the image forming section to the outside, and is then discharged via said outlet path after a discharge of said second recording medium from the last.

25. An image forming apparatus for storing image data and providing said image data to a recording medium at an image forming section, said image forming apparatus comprising:

a reversing section for reversing the recording medium and again delivering said recording medium to the image forming section to thereby form the image data on both sides of said recording medium; and an outlet path included in said reversing section path, for directly delivering, when the image data does not have to be transferred to a rear side of a last recording medium, said last recording medium carrying an image on a front side thereof and positioned at said reversing section to an outside of said image forming apparatus without the intermediary of the image forming section, wherein said reversing section reverses a direction of conveyance of the recording medium from the image forming section and turns over said recording medium, said outlet path being formed at a position which said recording medium delivered from said reversing section passes, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

26. An apparatus as claimed in claim 25, wherein the last recording medium is reversed by said reversing section before the second paper sheet from the last is directly discharged from the image forming section to the outside, and is then discharged via said outlet path after a discharge of said second recording medium from the last.

27. An image forming apparatus for storing image data and providing said image data to a recording medium at an image forming section, said image forming apparatus comprising:

a reversing section for reversing the recording medium and again delivering said recording medium to the image forming section to thereby form the image data on both sides of said recording medium; and an outlet path included in said reversing section path, for directly delivering, when the image data does not have to be transferred to a rear side of a last recording medium, said last recording medium carrying an image on a front side thereof and positioned at said reversing section to an outside of said image forming apparatus without the intermediary of the image forming section, and wherein said reversing section delivers a trailing edge of a second recording medium from the last and a leading edge of the last recording medium to the outside at an interval smaller than an interval between a trailing edge of another recording medium and a leading edge of a recording medium following said another recording medium.

28. An apparatus as claimed in claim 27, further comprising sensing means disposed in a discharging section, which discharges the recording medium to the outside, for sensing a pass of said recording medium, wherein when said sensing means senses a pass of the second recording medium from the last, the last recording medium is delivered to said outlet path.

29. An apparatus as claimed in claim 28, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

30. An apparatus as claimed in claim 29, wherein the last recording medium is reversed by said reversing section before the second paper sheet from the last is directly discharged from the image forming section to the outside, and is then discharged via said outlet path after a discharge of said second recording medium from the last.

31. An apparatus as claimed in claim 27, wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

32. An apparatus as claimed in claim 31, wherein the last recording medium is reversed by said reversing section before the second paper sheet from the last is directly discharged from the image forming section to the outside, and is then discharged via said outlet path after a discharge of said second recording medium from the last.

33. An image forming apparatus for storing image data and providing said image data to a recording medium at an image forming section, said image forming apparatus comprising:

a reversing section for reversing the recording medium and again delivering said recording medium to the image forming section to thereby form the image data on both sides of said recording medium; and an outlet path included in said reversing section path, for directly delivering, when the image data does not have to be transferred to a rear side of a last recording medium, said last recording medium carrying an image on a front side thereof and positioned at said reversing section to an outside of said image forming apparatus without the intermediary of the image forming section, and wherein after a third recording medium from the last has been conveyed to the image forming section via a registration position, the last recording medium begins to be fed from a recording medium feeding section, and wherein after said last recording medium has been conveyed to said image forming section via said registration position, the second recording medium from the last is delivered from said reversing section to said image forming section.

34. An apparatus as claimed in claim 33, wherein the last recording medium is reversed by said reversing section before the second paper sheet from the last is directly discharged from the image forming section to the outside, and is then discharged via said outlet path after a discharge of said second recording medium from the last.

\* \* \* \* \*